Feb. 19, 1929. 1,702,992
P. BORER
MACHINE FOR PEELING POTATOES, APPLES, AND THE LIKE
Filed Jan. 6, 1927
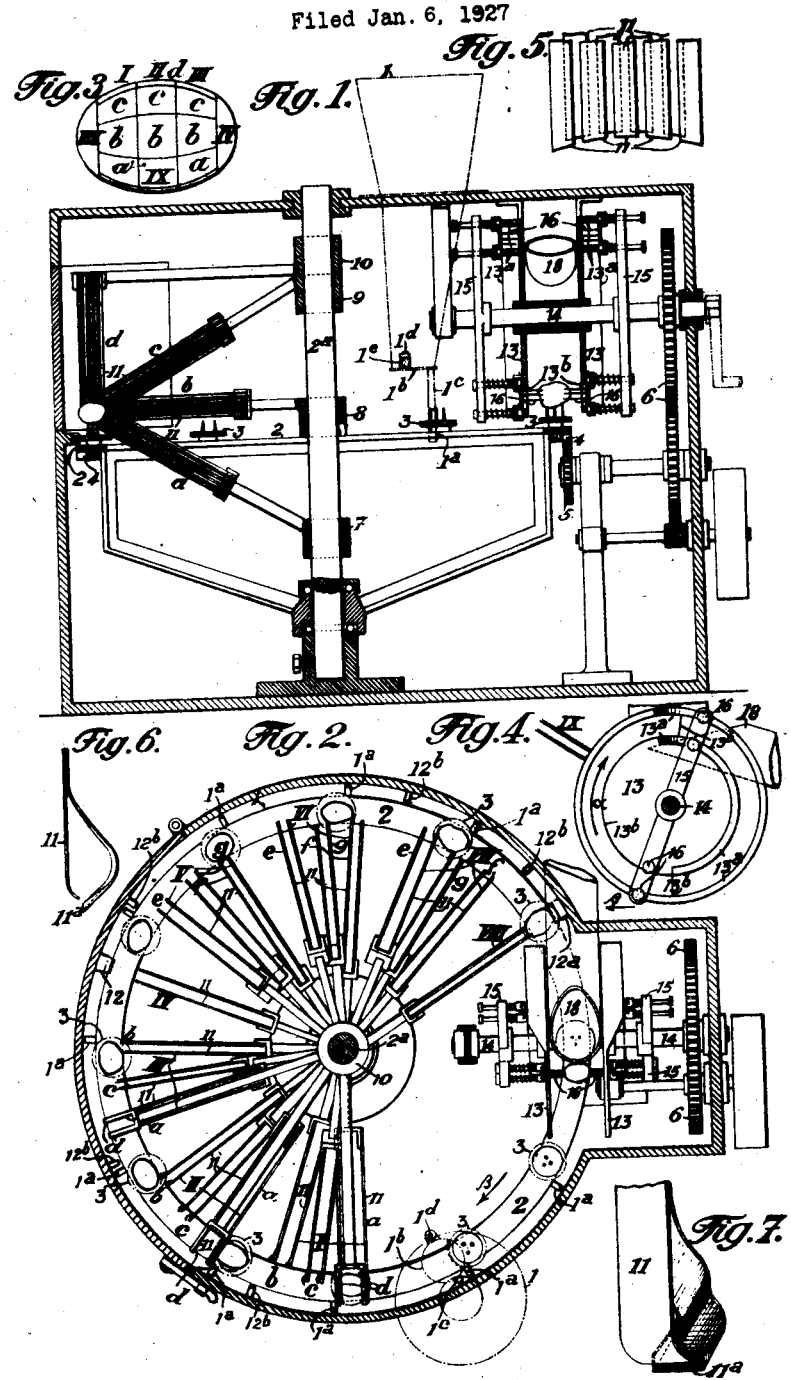
INVENTOR
Paul Borer
by Langner, Parry, Card & Langner Attys.

Patented Feb. 19, 1929.

1,702,992

UNITED STATES PATENT OFFICE.

PAUL BORER, OF DELEMENT, SWITZERLAND.

MACHINE FOR PEELING POTATOES, APPLES, AND THE LIKE.

Application filed January 6, 1927, Serial No. 159,428, and in Switzerland January 19, 1926.

This invention relates to a machine for peeling potatoes, apples and the like, which is characterized by the object to be peeled being carried by a circulating transport member to a series of peeling tools, which are so arranged and formed that during the passage of the object each one operates on a particular segment of the surface thereof and they thus peel the object section by section.

The accompanying drawing illustrates an example embodying the invention, for peeling potatoes for example.

Figure 1 is a vertical section and Figure 2 a horizontal section, of the machine.

Figure 3 is a diagram of the working sequence of the various knife sets, while Figures 4 to 7 show details.

On the machine framing is a hopper 1 for feeding the potatoes one at a time, beneath which is an annular table or ring 2 rotatable about a fixed spindle $2^a$ and furnished with toothed plates 3. A pin $1^a$ is provided on the ring 2 adjacent to each plate 3. At the bottom of the hopper 1 is a self-closing disc $1^b$ which carries an opening pin projecting down into the path of the pins $1^a$. The closing disc $1^b$ is rotatable on a pin $1^d$ on which is mounted a torsional closing spring $1^e$ (Figure 1).

In order to rotate the ring 2 it is provided on its under side with a toothed crown 4 with which meshes the wheel 5 of a driving gear 6 driven by a motor or a crank.

On the stationary spindle $2^a$ are secured a number of arm carriers 7, 8, 9, 10. The arms of these carriers are constructed to hold knife blades 11 sprung as lightly as possible, which are arranged in two rows on each arm, with the cutting edges $11^a$ of the rear row of blades 11 covering the gaps in the front blade row. The rows of knife blades on each arm are so formed in length and in the shape of the cutting edges that they are adapted to one part of the surface of the objects to be peeled. Figure 5 shows the relation of the blades to one another; for simplicity the cutting parts $11^a$ are omitted. The row of knife blades form to a certain extent a single combined knife consisting of single elements, which owing to these single elements can adapt itself as well as possible to unevenness in the object being peeled, so that the part of the surface of the object operated on by it can be peeled in correspondence with its convexity. These combined peeling knives are divided into groups and arranged in different directions within the individual groups. Thus for example the first three groups I, II, III each have four combined peeling knives, $a, b, c, d$, in which groups the knives $a$ are inclined upwards, the knives $b$ horizontally, the knives $c$ inclined downwards and the knives $d$ vertically downwardly directed towards the table ring 2, as can be seen in Figure 1, so as to constitute within each group several differently directed knives, but all converging substantially to the same working place and each of which consists of the aforesaid peeling blades. In Figure 1, the combined knives $b, c$ are shown as meeting with the combined knives $a$ and $d$. These three knife groups are followed in the direction of rotation of the plate ring 2 by a single combined peeling knife IV. There then follow again three groups V, VI, VII, each of three combined knives $e, f, g$, and finally a single combined knife VIII. The groups V, VI, VII differ from I, II and III in that they have no vertically suspended combined peeling knives. In the groups themselves the combined knives do not come into action together, but after one another in accordance with the angular disposition around the spindle $2^a$ (see Figure 2). Each knife, however, is designed always to operate on a specific part of the surface of the potatoes.

On the housing wall in the space between the knife groups I and II, II and III, IV and V, V and VI, VI and VII, is a pin $12^b$ and opposite the groups IV and VIII respectively a toothed member 12 and $12^a$, with which the toothing of the plates 3 can come into mesh during the rotation of the plate ring 2, in order to be rotated on their axes. The plates 3 are provided with upstanding pointed prongs to hold the potatoes to be peeled.

In order to remove the peeled potatoes from the plates 3, at one point on the path of the plate ring 2 is provided a removing device, which has two fixed discs 13 bearing a rotatable shaft 14 on which are mounted two cross arms 15. On the discs 13 are lifting ramps $13^a$. In addition slots $13^b$ are provided in these discs at the place where there are no lifting ramps. The arms 15 serve to convey forks 16 which under the action of springs continually bear against the discs 13 or the ramps $13^a$ thereon. The rotation of the shaft 14 with the arms 15 is so timed in relation to the rotation of the plate ring 2 that at the instant when a potato arrives on the plate 3 between the forks 16, these run off the ramps 13$^a$ of the disc 13, impale the potato, and since the potato is now held by the forks 16, which move further in the direction of the arrow α, on further rotation of the shaft 14, the potato is drawn off the prongs of the plate 3 and raised, while the plate relieved of the potato passes forward in the direction of the arrow β. While the potato is traversing the above described path, it engages a supplementary combined knife IX (Figure 4) the purpose of which is to peel that lower part of the potato which has up to then been protected from the other knives, owing to the potato having been impaled on the prongs of the plate 3. After this the forks 16 run on to the inclines of the ramps 13$^a$ and are drawn out of the potato and thus allow it to fall into a run off pipe 18.

The method of operation is as follows: The closing disc 1$^b$ of the hopper 1 is periodically opened through the pin 1$^c$ by the pins 1$^a$ on the rotating plate ring 2, and allows a potato to fall each time it is opened. This impales itself on the prongs of the plate 3 beneath. The plate ring 2 then carries it to the knife group I; here it is peeled on zones of its surface by the knives $d$ and $a$ vertically from above and obliquely from below, then by the knife $c$ obliquely from above and by the knife $b$ horizontally from the side. In order that this and the subsequent peeling operation may be more rapidly explained and readily understood reference is directed to Figure 3, in which the individual sections of the surface of the potato are indicated by the same references as the knives of the groups I, II, III operating thereon; the zones $a, b, c, d$ lying on the left in Figure 3 have thus been operated by the knife group I. The potato impaled on the plate 3, and already operated on by the knife group I then comes to the first pin 12$^b$ (reckoning in the direction of rotation); in consequence of the engagement of the pin with the plate toothing during the passing of the plate the latter undergoes a slight amount of rotation so that the potato presents a new part of its surface for peeling by the knife group II. When the plate arrives at the next pin 12$^b$ it again undergoes a slight amount of rotation in order to present a further surface part for peeling by the knife group III. The potato is thus peeled on one long side and the top in the segments indicated by $a, b, c, d$ in Figure 3. The plate with the potato peeled so far now arrives at the toothed member 12 and is here rotated by a larger amount which completes a half revolution. During this rotation the potato is peeled by the knife IV on one end. The knives in groups V—VII then come into action, and with the partial rotations of the potato peel the other long side in zones similarly to the first side as described above. The plate finally arrives at the toothed member 12$^a$ and undergoes again a larger amount of rotation, so that the knife VIII peels the other end of the potato. The potato is then only unpeeled on the underside. The plate ring 2 now carries the almost completely peeled potato to the removing device, which removes it from the plate prongs as described above, carries it past the supplementary knife IX for completion of the peeling and delivers it completely peeled to the run off pipe 18 when the forks 16 are withdrawn. The described procedure naturally applies to all the plates on the table ring 2, which always carry a potato except during the time when each plate arrives under the hopper 1 and this is opened to release a potato. The plates are only empty over a short part of the circuit. The machine therefore has a high output.

It will be understood that the hopper 1 is so formed that the potatoes as far as possible fall in the correct position on the plates 3 for the described method of operation, though divergences therefrom in position of the potatoes makes very little difference, since the only effect is not quite such good peeling. Further, the plates are made hard of rotation on their axes, in order that no undesired rotary movement of the plates will take place during peeling itself.

What I claim is:—

1. In a machine for peeling potatoes, apples and the like, the combination of a plurality of groups of stationary knives arranged, within each group, to converge substantially to the same working place, a rotary transport member, rotatable carriers thereon to carry the object to be peeled, a driving mechanism to rotate said transport member so as to bring the object to be peeled successively into the working range of said knife groups, and positioning means to intermittently rotate said carriers for the purpose of presenting the surface of the object section by section to peeling.

2. In a machine for peeling potatoes, apples and the like, the combination of a vertical stationary spindle, a plurality of groups of stationary knives carried by said spindle in angular displacement to one another so as to converge, within each group, substantially to the same working place, a rotary transport member, rotatable carriers thereon to carry the object to be peeled, a driving mechanism to rotate said transport member around said spindle so as to bring the object to be peeled successively into the working range of said knife groups, and positioning means to intermittently rotate said carriers for the purpose of presenting the surface of the object section by section to peeling.

3. In a machine for peeling potatoes, apples and the like, the combination of a vertical stationary spindle, a plurality of groups of stationary flexible blade knives carried by said spindle in angular displacement to one another so as to converge, within each group, substantially to the same working place, a rotary transport member, rotatable carriers thereon to carry the object to be peeled, a driving mechanism to rotate said transport member around said spindle so as to bring the object to be peeled successively into the working range of said knife groups, and positioning means to intermittently rotate said carriers for the purpose of presenting the surface of the object section by section to peeling.

4. In a machine for peeling potatoes, apples and the like, the combination of a plurality of groups of stationary knives arranged to converge, within each group, substantially to the same working place, a rotary transport member, rotatable plates thereon provided with prongs to hold the object to be peeled, a driving mechanism to rotate said transport member so as to bring the object to be peeled successively into the working range of said knife groups, and positioning means to intermittently rotate said holding plates for the purpose of presenting the surface of the object section by section to peeling.

5. In a machine for peeling potatoes, apples and the like, the combination of a plurality of groups of stationary knives arranged to converge, within each group, substantially to the same working place, a rotary transport member, rotatable carriers thereon to carry the object to be peeled, a driving mechanism to rotate said transport member so as to bring the object to be peeled successively into the working range of said knife groups, positioning means to intermittently rotate said carriers for the purpose of presenting the surface of the object section by section to peeling, and an automatic device for removing and delivering the object thus peeled.

6. In a machine for peeling potatoes, apples and the like, the combination of a plurality of groups of stationary knives arranged to converge, within each group, substantially to the same working place, a rotary transport member, rotatable carriers thereon to carry the object to be peeled, a driving mechanism to rotate said transport member so as to bring the object to be peeled successively into the working range of said knife groups, positioning means to intermittently rotate said carriers for the purpose of presenting the surface of the object section by section to peeling, rotatable removing forks arranged to grip the object when peeled and to remove it from its carrier, and a supplementary knife so arranged as to peel, after said removal, that part of the object which was turned to its carrier.

In witness whereof I have hereunto signed my name this 27th day of December, 1926.

PAUL BORER.